United States Patent
Condrasky et al.

(10) Patent No.: US 6,663,193 B1
(45) Date of Patent: Dec. 16, 2003

(54) RELAY VALVE BASED ACCELERATED BRAKE PIPE APPLICATION AND RELEASE SYSTEM

(75) Inventors: John P. Condrasky, Simpsonville, SC (US); James A. Wood, Spartanburg, SC (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 10/338,297

(22) Filed: Jan. 8, 2003

(51) Int. Cl.$^7$ .............................................. B60T 13/70
(52) U.S. Cl. .................. 303/82; 303/68; 303/3
(58) Field of Search .................... 303/3, 7, 15, 68, 303/81, 82

(56) References Cited

U.S. PATENT DOCUMENTS

| | | | | |
|---|---|---|---|---|
| 5,730,504 A | * | 3/1998 | Gaughan | 303/3 |
| 6,213,565 B1 | * | 4/2001 | Hart | 303/7 |
| 6,375,277 B1 | * | 4/2002 | Carroll | 303/68 |

* cited by examiner

Primary Examiner—Christopher P. Schwartz
(74) Attorney, Agent, or Firm—James Ray & Associates

(57) ABSTRACT

A relay valve based accelerated brake pipe application and release system having an electronic control module. A source of fluid pressure is connected to a valve device for receiving and transmitting fluid pressure signals. The valve device is connected to an exhaust to atmosphere. An accelerator volume has a fluid connection to the valve device for storing a predetermined volume of fluid. A brake pipe transducer is electronically connected to the control module and has a fluid connection to the valve device for transmitting a first pressure signal to the control module. A cut-out solenoid valve is electronically connected to the control module and includes a fluid connection to the brake pipe transducer for receiving at least one of a cut-in and a cut-out signal. An emergency solenoid valve is electronically connected to the control module and has a fluid connection to the cut-out solenoid valve for receiving an emergency signal. A cut-out device is included for opening and closing a fluid connection and it has a fluid connection to the emergency solenoid valve. An application solenoid valve is electronically connected to the control module and has a fluid connection to the cut-out solenoid valve for receiving an apply signal and for transmitting a pilot pressure to the cut-out solenoid valve. A release solenoid valve is electronically connected to the control module and has a fluid connection to the cut-out device for receiving a release signal.

20 Claims, 2 Drawing Sheets

RELAY VALVE BASED ACCELERATED BRAKE PIPE APPLICATION AND RELEASE SYSTEM

FIELD OF THE INVENTION

The present invention generally relates to railcar braking systems. More particularly, the present invention relates to a relay valve based accelerated brake pipe application and release system for passenger railcars having a modulated brake pipe.

BACKGROUND OF THE INVENTION

In prior art railcar braking systems, the functions of accelerated application and release of brakes on a railcar were normally performed by pneumatic devices. These pneumatic devices are large, heavy, and not contained in a single unit. The pneumatic devices must send their signals in series from one car to the next, allowing for significant periods of time to pass pneumatic signals to an entire train, especially trains with considerable number of cars. Also, it takes considerable time and expense to maintain the various pneumatic valves currently used to perform the accelerated application and release functions so they perform at peak levels. More recently, as is known in the art, prior art devices also offer an electro-pneumatic "overlay" to perform certain functions, but these "overlays" do not reduce the number of pneumatic devices on a railcar.

SUMMARY OF THE INVENTION

In one aspect, the invention provides a relay valve based accelerated brake pipe application and release system having an electronic control module. A source of fluid pressure is connected to a valve mechanism for receiving and transmitting fluid pressure signals. The valve mechanism has a fluid connection to an exhaust to atmosphere. There is an accelerator volume having a predetermined volume and a fluid connection to the valve mechanism for storing a predetermined volume of fluid. Included is a brake pipe transducer electronically connected to the control module and which has a fluid connection to the valve mechanism for transmitting a first pressure signal to the control module. There is a cut-out solenoid valve electronically connected to the control module and includes a fluid connection to the brake pipe transducer for receiving at least one of a cut-in and a cut-out signal. An emergency solenoid valve is electronically connected to the control module and it has a fluid connection to the cut-out solenoid valve for receiving an emergency signal. A cut-out device is included for opening and closing a fluid connection and it has a fluid connection to the emergency solenoid valve. Also an application solenoid valve is electronically connected to the control module and has a fluid connection to the cut-out solenoid valve for receiving an apply signal and for transmitting a pilot pressure to the cut-out solenoid valve. There is a release solenoid valve electronically connected to the control module and it has a fluid connection to the cut-out device for receiving a release signal and transmitting a pilot pressure to the application solenoid. The final essential element is a control transducer electronically connected to the control module and including a fluid connection to the release solenoid for transmitting a second pressure signal to the control module.

OBJECTS OF THE INVENTION

It is the primary object of the present invention to provide a relay valve based accelerated brake pipe application and release system which offers accelerated service friction brake application and release functions for inactive hauled passenger rail cars.

It is another object of the present invention to provide a relay valve based accelerated brake pipe application and release system which offers integrated accelerated service friction brake application and release functions with an electro-pneumatic means of controlling the brake pipe pressure.

It is a further object of the present invention to provide a relay valve based accelerated brake pipe application and release system which uses multiple diaphragm relay valve technology to integrate the functions of friction brake application and release.

It is still another object of the present invention to provide a relay valve based accelerated brake pipe application and release system which offers improved size, weight, and overall packaging of brake pipe control devices used on locomotive and rail cars.

It is even yet another object of the present invention to provide a relay valve based accelerated brake pipe application and release system which offers an electro-pneumatic brake pipe control function that is better integrated with all pneumatic back-up functions.

It is still a further object of the present invention to provide a relay valve based accelerated brake pipe application and release system which allows railcars equipped with this type of device to be run in trains having cars with older all pneumatic brake pipe control systems.

It is still even another object of the present invention to provide a relay valve based accelerated brake pipe application and release system which allows a train controlling car or locomotive to use the same items of electro-pneumatic brake pipe control as the cars that are performing brake pipe enhancement/overlay functions.

In addition to the above-described objects and advantages of the relay valve based accelerated brake pipe application and release system, various other objects and advantages of the present invention will become more readily apparent to the persons who are skilled in the same and related arts from the following more detailed description of the invention, particularly, when such description is taken in conjunction with the attached drawing figures and the appended claims.

DETAILED DESCRIPTION OF THE PRESENTLY PREFERRED EMBODIMENT

Figure 1:
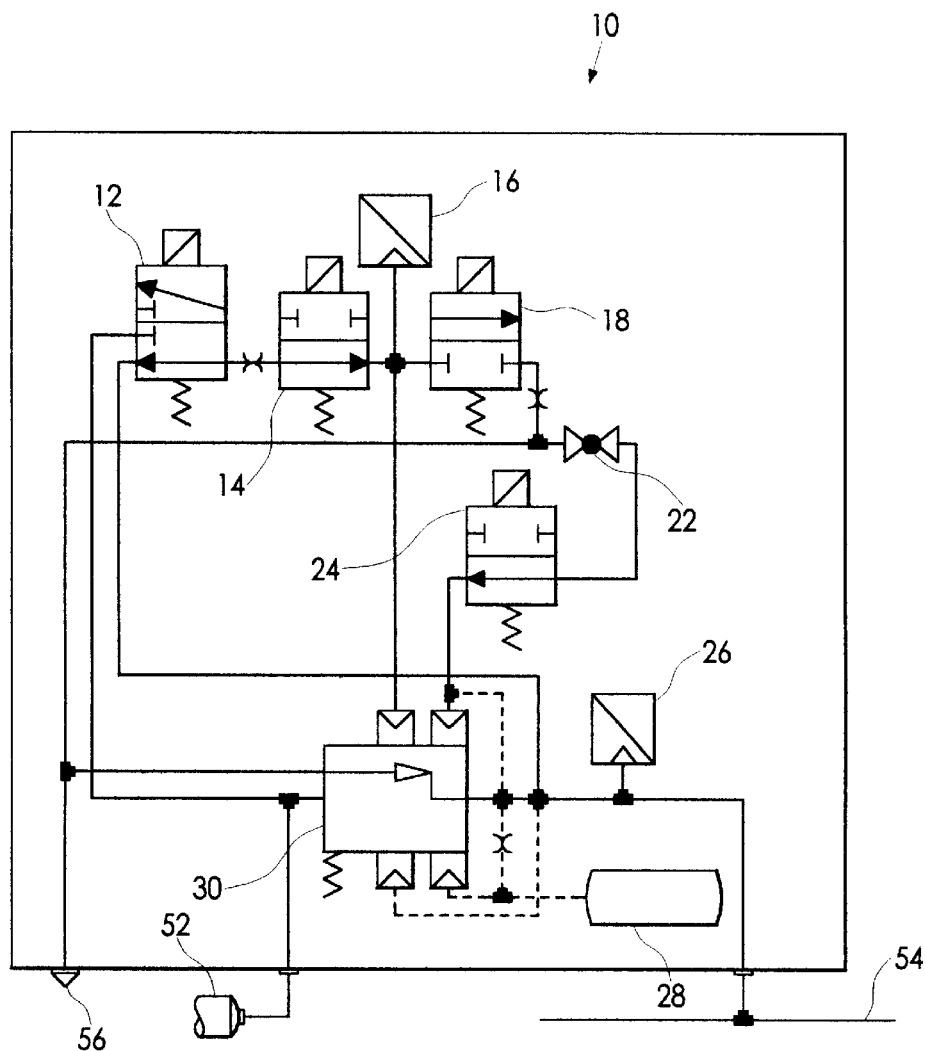
FIG. 1 is a piping schematic of the presently preferred embodiment of the relay valve based accelerated brake pipe application and release system.

Prior to proceeding to a much more detailed description of the present invention, it should be noted that identical components which have identical functions have been identified with identical reference numerals throughout the several views illustrated in the drawing figures for the sake of clarity and understanding of the invention.

Figure 2:
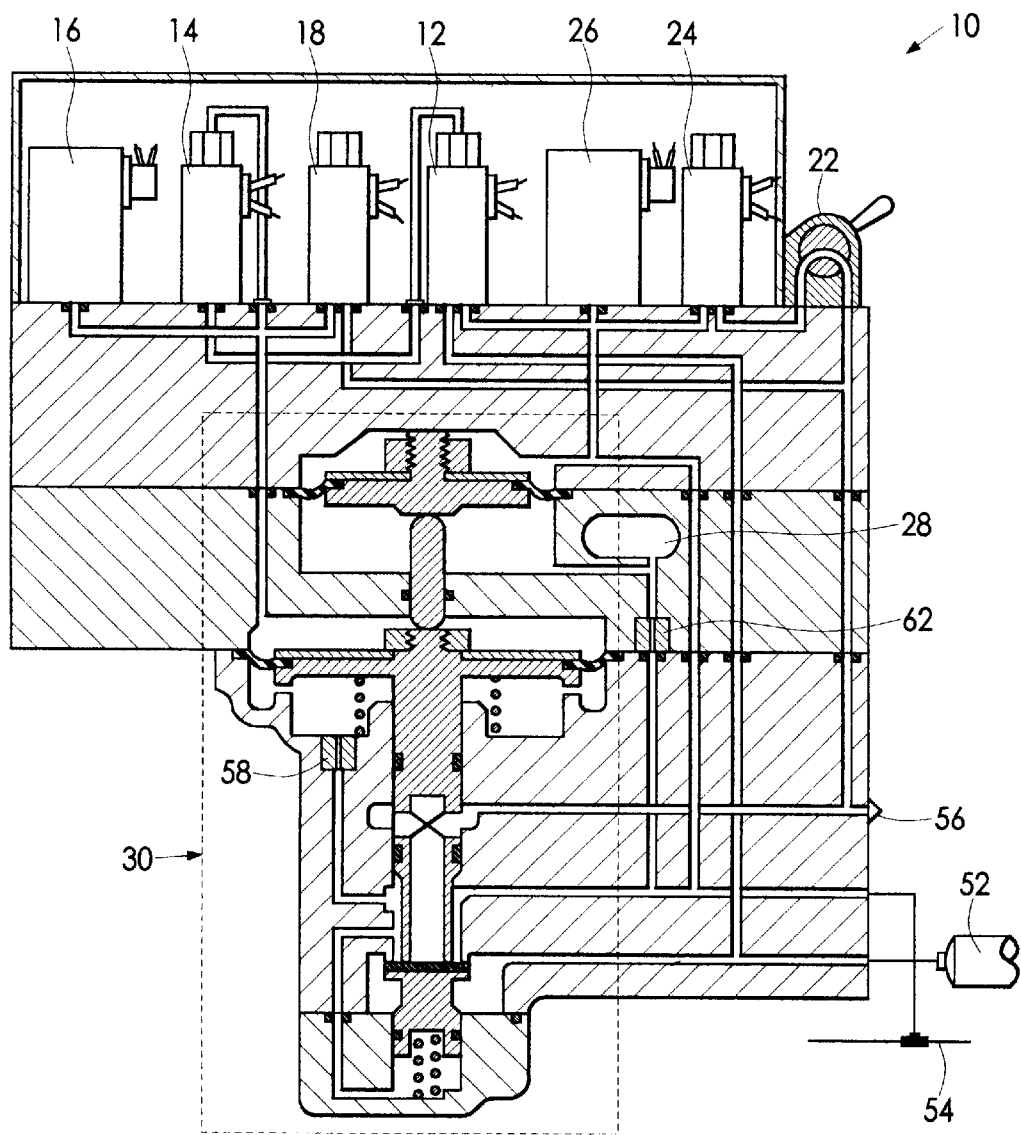
FIG. 2 is a diagrammatic and partial cut-away view of the presently preferred embodiment of the relay valve based accelerated brake pipe application and release system.

Referring now to FIGS. 1 and 2, a relay valve based accelerated brake pipe application and release system constructed according to the present invention is generally indicated by reference numeral 10. The relay valve based accelerated brake pipe application and release system 10 includes a valve means 30 connected to a source of fluid pressure, the source of fluid pressure being at least one of a connection to a main reservoir 52 pressure and a connection to a brake pipe 54 pressure. The valve means 30 includes a choke 58 having an orifice of a predetermined diameter in the fluid connection to brake pipe 54 pressure. The valve means 30 has a fluid connection to an exhaust 56 to atmosphere, and is connected for receiving and transmitting fluid pressure signals. There is an accelerator volume 28 having a volume of generally about forty-five cubic inches that has a fluid connection to the valve means 30. The fluid connection between the accelerator volume 28 and the valve means 30 includes a choke 62 having an orifice of a predetermined diameter. A brake pipe transducer 26 of the analog type is electronically connected to the control module (not shown) and has a fluid connection to the valve means 30 for transmitting a first pressure signal to the control module. A cut-out solenoid valve 12 of a three-way type is electronically connected to the control module and has a fluid connection to the brake pipe transducer 26 for receiving at least one of a cut-in and a cut-out signal. An emergency solenoid valve 24 of the two-way normally open type is electronically connected to the control module and has a fluid connection to the cut-out solenoid valve 12 for receiving an emergency signal. A cut-out means 22 has a fluid connection to the emergency solenoid valve 24 for opening and closing a fluid connection. In the present invention, the cut-out means 22 is at least one of a manually operated valve and an electronically operated valve. An application solenoid valve 14 of the two-way normally closed type is electronically connected to the control module and has a fluid connection to the cut-out solenoid valve 12 for receiving-an apply signal and also transmitting a pilot pressure to the cut-out solenoid valve 12. A release solenoid valve 18 of the two-way normally open type is electronically connected to the control module and includes a fluid connection to the cut-out means 22 for receiving a release signal and transmitting a pilot pressure to the application solenoid valve 14. A control transducer 16 of the analog type is electronically connected to the control module and includes a fluid connection to the release solenoid valve 18 for transmitting a second pressure signal to the control module.

In the presently preferred embodiment of the invention, the accelerated Brake Pipe application and release is realized by the choke 62 interposed in the fluid connection between the application volume 28 and the valve means 30. The choke 62 allows the valve means 30 to locally enhance any rise or fall in the brake pipe 54 pressure by creating a brief pulse in the brake pipe 54 pressure initially, which will help propagate the rise in brake pipe 54 pressure to the next car in the train. A drop in brake pipe 54 pressure will be handled in a similar manner. When the brake pipe 54 pressure drops, the force imbalance will be in the opposite direction, causing the brake pipe 54 pressure to be sent to an exhaust 56 to atmosphere. This will create an exaggerated Initialized drop in the brake pipe 54 pressure. Again, this will help propagate the drop in brake pipe 54 pressure to the next car in the train.

The relay valve based accelerated brake pipe application and release system 10 constructed according to the present invention is designed to operate in each of an electro-pneumatic mode and an all pneumatic mode. The cut-out solenoid valve 12 receives an electronic signal from the control means to transfer between electro-pneumatic mode and an all pneumatic mode. When the cut-out solenoid valve 12 is energized, the application solenoid 14 valve, the release solenoid valve 18, and the control transducer 16 are all connected to the valve means 30. By varying the main reservoir 52 pressure sent to the valve means 30, the brake pipe 54 pressure can be enhanced by an electrical trainline overlay (not shown). When the cut-out solenoid valve 12 is de-energized by the control module, the valve means 30 is connected directly to brake pipe 54 pressure. In this case the relay valve based accelerated brake pipe application and release system 10 will operate as discussed previously in the preceding paragraph.

The relay valve based accelerated brake pipe application and release system 10 includes an Emergency function. This function is achieved by the emergency solenoid valve 24 and cut-out solenoid valve 12. The emergency solenoid valve 24 is connected electrically to the control module. During normal train operation the control module would keep the emergency solenoid valve 24 energized. If an emergency brake has to be applied, the control module de-energizes the emergency solenoid valve 24, creating a rapid localized drop in pressure within the valve means and in the brake pipe 54 pressure connection. This would cause the valve means 30 in addition to the emergency solenoid valve 24 to direct Brake pipe 54 pressure to an exhaust 56 to atmosphere. This would send a fluid signal indicative of an emergency condition to the entire train. The cut-out means 22 is used to cut-out or cut-in the emergency function on each respective car. Not all cars in a train are connected to an emergency system. The cut-out means 22 allows selective use of this feature.

The relay valve based accelerated brake pipe application and release system 10 includes a Brake pipe pressure maintaining function. This function is the responsibility of the brake pipe transducer 26. The Brake pipe Transducer 26 converts an air pressure to electrical voltage. The brake pipe Transducer 26 provides two functions, a first being a control feedback used in complex brake pipe 54 pressure control situations. The brake pipe Transducer 26 is used in conjunction with the control transducer 16 to provide the necessary information to the control module to perform brake pipe 54 pressure control and overlay functions. The second function provided by the brake pipe transducer 26 is that it can be compared with the control transducer 16 for diagnostic purposes.

While the present invention has been described by way of a detailed description of a particularly preferred embodiment, it will be readily apparent to those of ordinary skill in the art that various substitutions of equivalents may be affected without departing from the spirit or scope of the inventions set forth in the appended claims.

We claim:

1. A relay valve based accelerated brake pipe application and release system, said application and release system comprising:

(a) an electronic control module;

(b) a source of fluid pressure;

(c) a valve means connected to said source of fluid pressure for receiving and transmitting fluid pressure signals, said valve means having a fluid connection to an exhaust to atmosphere;

(d) an accelerator volume having a predetermined volume and having a fluid connection to said valve means for storing said predetermined volume of fluid;

(e) a brake pipe transducer electronically connected to said control module and having a fluid connection to said valve means for transmitting a first pressure signal to said control module;

(f) a cut-out solenoid valve electronically connected to said control module and having a fluid connection to said brake pipe transducer for receiving at least one of a cut-in and a cut-out signal;

(g) an emergency solenoid valve electronically connected to said control module and having a fluid connection to said cut-out solenoid valve for receiving an emergency signal;

(h) a cut-out means having a fluid connection to said emergency solenoid valve for opening and closing a fluid connection;

(i) an application solenoid valve electronically connected to said control module and having a fluid connection to said cut-out solenoid valve for receiving an apply signal and transmitting a pilot pressure to said cut-out solenoid valve;

(j) a release solenoid valve electronically connected to said control module and a including a fluid connection to said cut-out means for receiving a release signal and transmitting a pilot pressure to said application solenoid; and (k) a control transducer electronically connected to said control module and including a fluid connection to said release solenoid valve for transmitting a second pressure signal to said control module.

2. A relay valve based accelerated brake pipe application and release system according to claim 1, wherein said source of fluid pressure being at least one of a main reservoir pressure and a brake pipe pressure.

3. A relay valve based accelerated brake pipe application and release system according to claim 1, wherein said source of fluid pressure includes both said main reservoir pressure and said brake pipe pressure.

4. A relay valve based accelerated brake pipe application and release system according to claim 1, wherein said cut-out solenoid valve is a three-way solenoid valve.

5. A relay valve based accelerated brake pipe application and release system according to claim 1, wherein said application solenoid valve is a two-way normally closed solenoid valve.

6. A relay valve based accelerated brake pipe application and release system according to claim 1, wherein said release solenoid valve is a two-way normally open solenoid valve.

7. A relay valve based accelerated brake pipe application and release system according to claim 1, wherein said emergency solenoid valve is a two-way normally open solenoid valve.

8. A relay valve based accelerated brake pipe application and release system according to claim 1, wherein said predetermined volume of said application volume is generally about forty-five cubic inches.

9. A relay valve based accelerated brake pipe application and release system according to claim 1, wherein said fluid connection between said accelerator volume and said valve means includes a choke having an orifice of a predetermined diameter.

10. A relay valve based accelerated brake pipe application and release system according to claim 1, wherein said valve means includes a choke having an orifice of a predetermined diameter in said fluid connection to said brake pipe pressure.

11. A relay valve based accelerated brake pipe application and release system according to claim 1, wherein said cut-out means is at least one of a manually operated valve and an electronically operated valve.

12. A relay valve based accelerated brake pipe application and release system according to claim 1, wherein said cut-out means is a manually operated valve.

13. A relay valve based accelerated brake pipe application and release system according to claim 1, wherein said control transducer converts a fluid pressure signal to an electronic signal.

14. A relay valve based accelerated brake pipe application and release system according to claim 1, wherein said control transducer is an analog type.

15. A relay valve based accelerated brake pipe application and release system according to claim 1, wherein said brake pipe transducer converts a fluid pressure signal to an electronic signal.

16. A relay valve based accelerated brake pipe application and release system according to claim 1, wherein said brake pipe transducer is an analog type.

17. A relay valve based accelerated brake pipe application and release system according to claim 1, wherein said cut-out solenoid valve receives each of a cut-in and a cut-out signal.

18. A relay valve based accelerated brake pipe application and release system according to claim 1, wherein said valve means includes a predetermined plurality of biasing means.

19. A relay valve based accelerated brake pipe application and release system according to claim 1, wherein said system operates in an electro-pneumatic mode.

20. A relay valve based accelerated brake pipe application and release system according to claim 1, wherein said system operates in an all pneumatic mode.

* * * * *